United States Patent
Hutchison et al.

(10) Patent No.: US 9,632,756 B2
(45) Date of Patent: *Apr. 25, 2017

(54) DETERMINATION OF A SET OF CANDIDATE CODE INSERTIONS FOR INSERTION IN PROGRAM CODE

(75) Inventors: Gordon D. Hutchison, Hants (GB); David G. Screen, Winchester (GB); Joseph R. Winchester, Hursley (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 333 days.

This patent is subject to a terminal disclaimer.

(21) Appl. No.: 13/557,746

(22) Filed: Jul. 25, 2012

(65) Prior Publication Data

US 2012/0291010 A1 Nov. 15, 2012

Related U.S. Application Data

(63) Continuation of application No. 12/109,410, filed on Apr. 25, 2008, now Pat. No. 8,307,335.

(30) Foreign Application Priority Data

Apr. 30, 2007 (EP) ..................................... 07107253

(51) Int. Cl.
*G06F 9/44* (2006.01)

(52) U.S. Cl.
CPC ..................................... *G06F 8/33* (2013.01)

(58) Field of Classification Search
None
See application file for complete search history.

(56) References Cited

U.S. PATENT DOCUMENTS

| 5,798,757 | A | * | 8/1998 | Smith .......................... 715/709 |
| 5,953,731 | A |   | 9/1999 | Glaser |
| 6,314,559 | B1 |  | 11/2001 | Sollich |
| 7,296,264 | B2 |  | 11/2007 | Zatloukal et al. |
| 7,665,061 | B2 | * | 2/2010 | Kothari et al. ............... 717/106 |
| 7,865,870 | B2 |  | 1/2011 | Gunturi et al. |
| 2003/0200528 | A1 | | 10/2003 | Li |
| 2004/0205708 | A1 | | 10/2004 | Kothari et al. |
| 2005/0065930 | A1 | * | 3/2005 | Swaminathan et al. .......... 707/6 |
| 2005/0125773 | A1 | * | 6/2005 | Hawley et al. ............... 717/109 |
| 2005/0166193 | A1 | | 7/2005 | Smith et al. |
| 2006/0005169 | A1 | | 1/2006 | Berstis et al. |
| 2006/0026559 | A1 | * | 2/2006 | Gunturi et al. ............... 717/110 |

(Continued)

OTHER PUBLICATIONS

"Word 'set' Definitions from Dictionary.com", Dec. 6, 2006.*

(Continued)

*Primary Examiner* — Daxin Wu
(74) *Attorney, Agent, or Firm* — Cuenot, Forsythe & Kim, LLC

(57) ABSTRACT

A code assistance feature provides a user with a set of suggested program code insertions at a given point in the program code being edited. For example, in response to a user command, the feature identifies syntactically correct possible insertions derived from a search for insertions of a compatible type. The feature identifies members in the set of possible code insertions that can be expanded via a field dereference or subroutine call to provide further possible code insertions for selection by the user.

21 Claims, 5 Drawing Sheets

(56) References Cited

U.S. PATENT DOCUMENTS

| | | |
|---|---|---|
| 2006/0036996 A1* | 2/2006 | Low .............................. 717/113 |
| 2006/0047653 A1* | 3/2006 | Vaidyanathan et al. .......... 707/6 |
| 2007/0198617 A1* | 8/2007 | Joisha .......................... 707/206 |
| 2009/0024937 A1 | 1/2009 | Lauff et al. |
| 2009/0077535 A1 | 3/2009 | Peterson |
| 2009/0254880 A1 | 10/2009 | Gryko et al. |

OTHER PUBLICATIONS

"'Position' definitions from Dictionary.com", Jan. 26, 2007.*
Kaiser, G.E., et al., "Intelligent Assistance for Software Development and Maintenance", IEEE Software, pp. 40-49, May 1988.
Massoni, J., "An Inside Look at Developing Applicaitons Using the New Features of Visual C++ 6.0," [online] MSDN Microsoft Systems Journal, Oct. 1998, retrieved from the Internet<http://www.microsoft.com/msj/1098/vc6newfeatures/vc6newfeatures.aspx>, 13 pgs.

* cited by examiner

```
public class UserClass { private T2 localField = new T2();
    private String someField = null;
    private F field = new F();
    private Map field2=new HashMap();
    private T2 localMethod() { return localField;     } public T someMethod(String s) {return localField;     } public T getTheT() {                                    201
        T returnValue = null;
        T newT =
        newT.setName("fred");
        returnValue = newT;
        return returnValue;
    } private H anotherMethod() {     return new H();    }
}
```

Figure 2

```
Candidate Code Insertions newT = localMethod();
        newT = getTheT();
        newT = returnValue;
        newT = localField;
        newT = newT;
        newT = someMethod(someField);
        newT = field.someGetT();
        newT = field.X;
        newT = field.method(field2).getT();
        newT = anotherMethod().another().getT();
```

Figure 3

```
public class F { public static final T X = new T();
    /**
     * @return
     */
    public T someGetT() {
return X;
    }
    /**
     * @param field2
     * @return
     */
    public G method(Map field2) {
return new G();
    }
}
```

Figure 4

```
public class G {

/**
     * @return
     */
    public T getT() {
        return null;
    }
    public T getT2() {
        return null;
    }
}
```

Figure 5

```
public class H {

/**
     * @return
     */
    public G another() {
            // TODO Auto-generated method stub
            return null;
    } public G similar() {
            return null;
    }

```
public class T {

/**
     * @param string
     * @return
     */
    public void setName(String string) {
    }

```
public class T2 extends T {

: # DETERMINATION OF A SET OF CANDIDATE CODE INSERTIONS FOR INSERTION IN PROGRAM CODE

CROSS-REFERENCE TO RELATED APPLICATIONS

This application is a Continuation of U.S. application Ser. No. 12/109,410, filed on Apr. 25, 2008, which claims priority to European Patent Application No. 07107253.2 filed Apr. 30, 2007, each of which is hereby incorporated by reference.

BACKGROUND OF THE INVENTION

The present invention relates to a method, apparatus or software for determining a set of candidate code insertions for insertion in program code.

Program code for programmable devices such as software for computers is commonly created in a code editor application program that may be provided as a standalone program or as part of an integrated development environment (IDE). Some code editors provide a facility for providing the user with suggested sections of code that may be chosen for insertion at a given point in the program code being edited. Such facilities may be referred to as a code completion (CC), code assistance (CA) or auto-complete facility and are commonly triggered by the user entering a given command. The sections of code offered to the users aim to be syntactically correct for the programming language being used. Some CA systems provide expressions that are relevant for the current namespace. In other words, expressions, such as fields or subroutine calls, are provided from within the scope relative to their insertion point in the program code.

CA systems can reduce the need for a programmer to manually search for an appropriate expression to insert. One problem however is that the appropriate or required expression may not appear in the suggestions provided by the CA system. In this case, the programmer may need to perform a manual search for the required expression.

SUMMARY OF THE INVENTION

An embodiment of the invention provides a method for determining a set of candidate code insertions for insertion in program code, the method comprising the steps of: a) receiving an indication of a position in a section of program code at which a code insertion may be performed; b) determining the required type of the code insertion in accordance with the syntax of the program code; c) identifying a set of possible code insertions comprising one or more expressions in scope at the position in the section of program code; d) identifying from each possible code insertion any available field dereference or subroutine call for providing one or more further possible code insertions; e) adding each further possible code insertion to the set of possible code insertions; and f) selecting each possible code insertion of the required type to provide a set of candidate code insertions for selection by a user for insertion at the position in the section of program code.

The method may comprise the further step of: identifying from each further possible code insertion any further available field dereference or subroutine call for providing one or more yet further possible code insertions and adding each yet further possible code insertion to the set of possible code insertions for selection as a candidate code insertion. The method may comprise the further step of: for each expression in the set of possible code insertions in the form of a subroutine call having one or more missing parameters, iteratively determining a value for the or each missing parameter from the set of possible code insertions.

The required type may be identified from a predetermined representation of the semantics of the section of program code. The predetermined representation may be an abstract syntax tree. The set of candidate code insertions presented to a user for selection may be ordered by the number of field dereferences or subroutine calls that the candidate code comprises. The set of candidate code insertions presented to a user for selection may be ordered depending on the level of scope of the candidate code insertion at the position. The set of candidate code insertions presented to a user for selection may be ordered depending on the frequency of use of each the candidate code insertion in the section of code. The set of candidate code completions presented to a user for selection may be ordered depending on the proximity in the section of code of each the candidate code insertion to the indicated position. Where a given expression is present in the section of code in a plurality of equivalent forms, only one of the forms may be selected for inclusion in the set of possible code insertions.

Another embodiment provides apparatus for determining a set of candidate code insertions for insertion in program code, the apparatus being operable to: receive an indication of a position in a section of program code at which a code insertion may be performed; determine the required type of the code insertion in accordance with the syntax of the program code; identify a set of possible code insertions comprising one or more expressions in scope at the position in the section of program code; identify from each possible code insertion any available field dereference or subroutine call for providing one or more further possible code insertions; add each further possible code insertion to the set of possible code insertions; and select each possible code insertion of the required type to provide a set of candidate code insertions for selection by a user for insertion at the position in the section of program code.

A further embodiment provides a program or set of programs arranged to enable a group of one or more program programmable devices to perform a method for determining a set of candidate code insertions for insertion in program code, the method comprising the steps of: a) receiving an indication of a position in a section of program code at which a code insertion may be performed; b) determining the required type of the code insertion in accordance with the syntax of the program code; c) identifying a set of possible code insertions comprising one or more expressions in scope at the position in the section of program code; d) identifying from each possible code insertion any available field dereference or subroutine call for providing one or more further possible code insertions; e) adding each further possible code insertion to the set of possible code insertions; and f) selecting each possible code insertion of the required type to provide a set of candidate code insertions for selection by a user for insertion at the position in the section of program code.

Another embodiment provides a program or set of programs arranged to enable a group of one or more program programmable devices to provide apparatus for determining a set of candidate code insertions for insertion in program code, the apparatus being operable to: receive an indication of a position in a section of program code at which a code insertion may be performed; determine the required type of the code insertion in accordance with the syntax of the program code; identify a set of possible code insertions comprising one or more expressions in scope at the position in the section of program code; identify from each possible code insertion any available field dereference or subroutine call for providing one or more further possible code insertions; add each further possible code insertion to the set of possible code insertions; and select each possible code insertion of the required type to provide a set of candidate code insertions for selection by a user for insertion at the position in the section of program code.

BRIEF DESCRIPTION OF THE DRAWINGS

Embodiments of the invention will now be described, by way of example only, with reference to the accompanying drawings in which:

FIG. 2 is a section of program code in the code editor of FIG. 1;

FIG. 3 is a set of candidate code insertions provided by the code editor for insertion in the section of program code of FIG. 2.

FIGS. 4 to 8 are further sections program code stored in the system of FIG. 1 and related to the section of program code of FIG. 2.

DETAILED DESCRIPTION OF THE INVENTION

Figure 1:
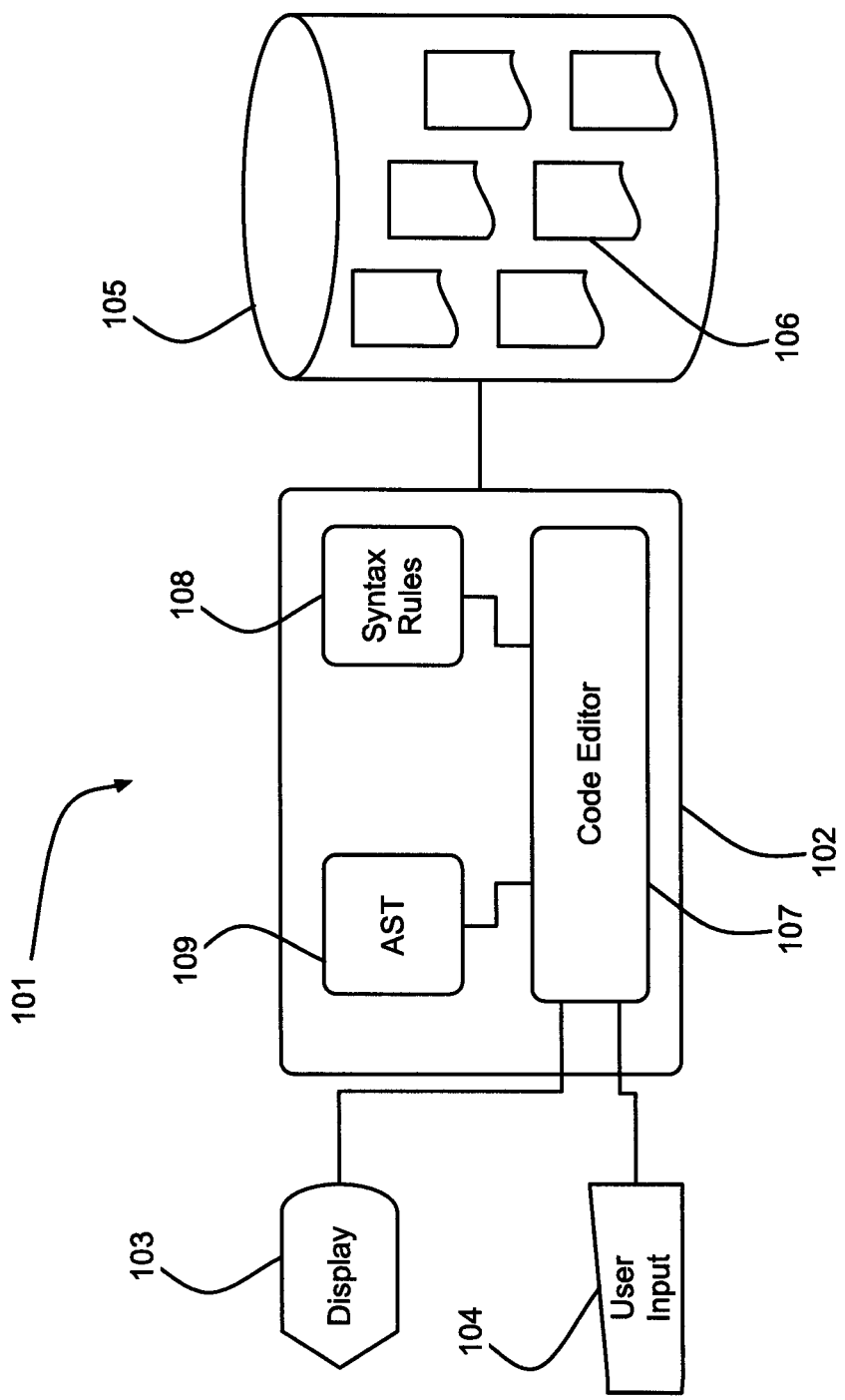
FIG. 1 is a schematic illustration of a software development system comprising a code editor.

With reference to FIG. 1, a software development system 101 comprises a computer 102 connected to an output device in the form of a display 103 and input devices in the form of a keyboard and mouse 104. The computer 102 is also connected to a storage device in the form of a disk drive 105 used to store program code files 106. The computer 102 runs an application program in the form of a code editor 107, which enables a user to create and edit program code. The code editor 107 is arranged to parse the program code as it is created or edited by a user in the code editor 107. The parsing is performed in accordance with a set of syntax rules 108 for the appropriate programming language and results in a representation of the syntax of the created program code in the form of an abstract syntax tree (AST) 109. The AST 109 thus provides a representation of the semantics of the section of program code to which it relates. In the present embodiment, the program code is created in the Java™ programming language.

The code editor 107 is arranged provide a code assistance (CA) feature operable in response to a predetermined command from a user. In response to a CA command, which indicates an insertion position in the program code, the code editor is arranged to identify a set of possible code insertions comprising program code expressions that could be validly inserted at the given position. In other words, the possible code insertions are those expressions that are reachable, that is, in scope, relative the given position. The set of possible code insertions is identified by the code editor from a breadth first search of the AST 109. Any expressions in the set of possible code insertions that are of a compatible type for possible insertion at the given position are displayed to the user as candidate code insertions. The code editor 107 is then further arranged to identify any expressions in the set of possible code insertions that could be expanded via a field dereference or subroutine call so as to provide one or more further possible code insertions. Any such further possible code insertions of a compatible type for insertion at the given position are also provided in the set of candidate code insertions for selection by the user.

FIG. 2 shows an example section of program code 106 in the form a Java™ class definition for a class named "UserClass". The class "UserClass" is part of a software program that makes use of five further classes named "F", "G", "H", "T" and "T2" shown in FIGS. 4, 5, 6, 7 and 8 respectively. With the cursor at the proposed code insertion position 201, the user has selected the CA facility. At the position 201, the expressions in scope are those defined within the class "UserClass" as set out in the table below:

| Category | Java Type | Name |
| --- | --- | --- |
| Field in class | T2 | localField |
| | F | field |
| | Map | field2 |
| | String | someField |
| Local variable (method level variable) | T | returnValue |
| | T | newT |
| Method parameter | None | |
| Class method | T2 | localMethod |
| | T | someMethod |
| | T | getTheT |
| | H | anotherMethod |

At the insertion point 201, something of the type T is required to be assigned to the new variable called "newT". Therefore, only the expressions in the table above of type T are appropriate to be offered to the user as part of a list of candidate code insertions as shown in FIG. 3. The definitions of type T and subtype T2 are shown in FIGS. 7 and 8 respectively. Type T is a string type and type T2 extends type T. In the present example, a search of the AST 109 reveals ten possible code insertions for position 201, but only six of the expressions are provided to the user as candidate code insertions. In other words, the fields "field", "field2", "someField" and the class method "anotherMethod" are omitted form the set of candidate code insertions as they are not of type T. However, as shown in FIG. 3, further candidate code insertions are available. For example, the dereferencing of the field "field" of type F brings into scope the field "X" of type T along with the method "someGetT" that has a return type of type T. The field "X" and the method "someGetT" are both defined in the class F as shown in FIG. 4. Thus a seventh and eighth candidate code insertion of type T are provided to the user as shown in FIG. 3.

While each valid field dereference or method call from the expressions in the table will result in a possible code insertion, not all such possible code insertions will be of the required type. For example, as shown in FIG. 4, the class F also has a method "method" having a return type of type G and thus in itself not a candidate code insertion. However, the type G, as defined in class G in FIG. 5, has a method "getT" that has a return type of type T.

Thus, a ninth candidate code insertion is provided to the user as shown in FIG. 3. Furthermore, the class "UserClass" shown in FIG. 2 also has a method "anotherMethod" of type H. Class H, as shown in FIG. 6 has a method "another" of type G. As noted above, class G shown in FIG. 5, has a method "getT" that has a return type of type T. Thus, a tenth candidate code insertion is provided to the user as shown in FIG. 3.

In the present embodiment, the CA facility is arranged to avoid providing candidate code insertions that comprise subroutines having equivalent signatures. In other words, each method has the same return type and compatible method parameters in that the parameters have identical types and ordering. For example, with reference to FIG. 6, class H defines two methods, one called "another" and the other called "similar", that have equivalent signatures. Similarly, class G defines two methods, one called "getT" and the other called "getT2". Thus, the equivalent variations of the ninth and tenth candidate code insertions in FIG. 3 that would use the methods "similar" and "getT2" are not provided as candidate code insertions.

Figure 9:
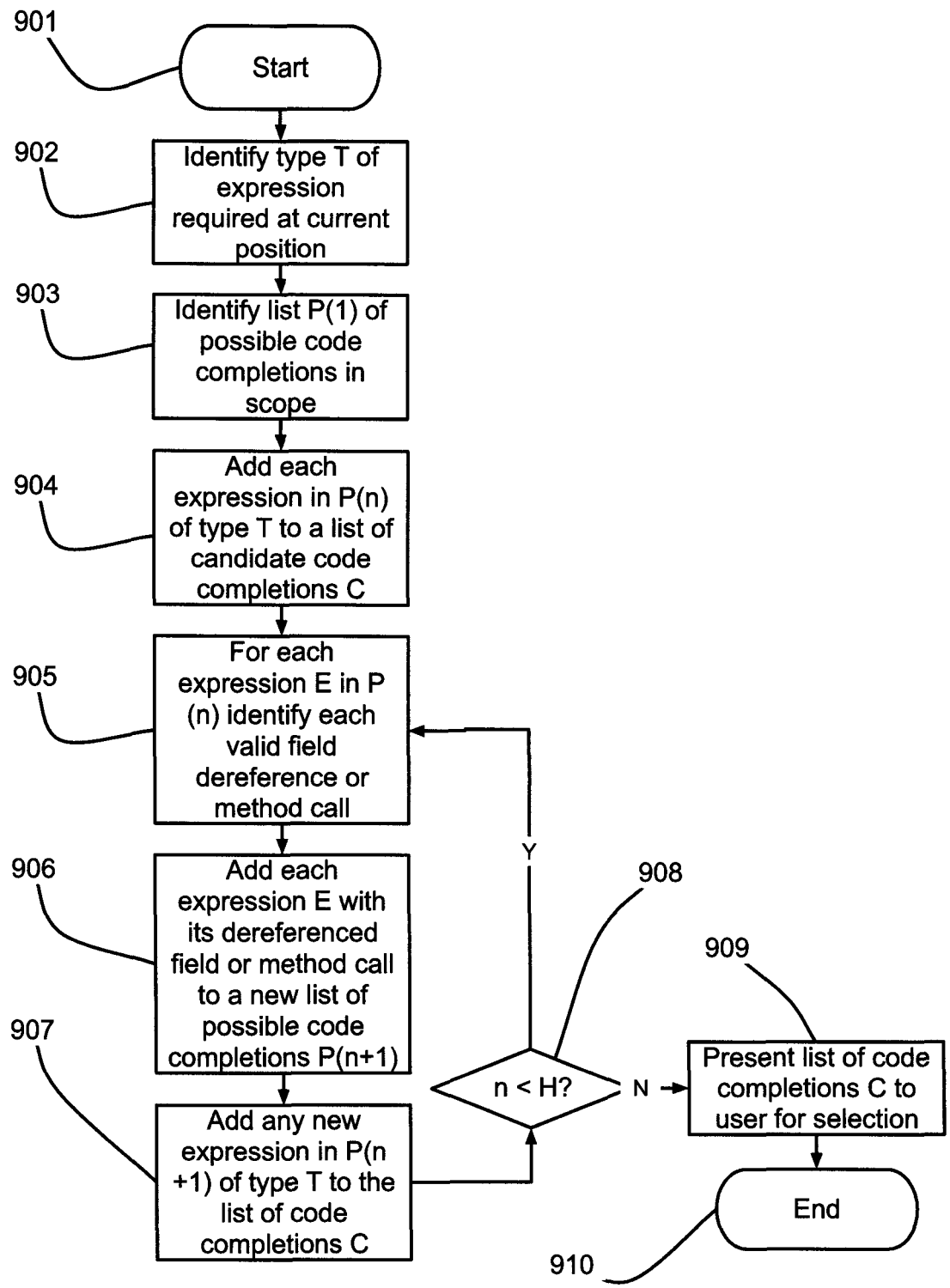
FIG. 9 is a flow chart illustrating the processing performed by the code editor of FIG. 1 when providing a set candidate code insertions for insertion in program code.

The processing performed by the code editor 107 to produce a set of candidate code insertion will now be described with reference to the flowchart of FIG. 9. At step 901, the CA command is received from the user via the keyboard and mouse 104 indicating a position, such as position 201, in a section of program code at which the user requires a set of candidate code insertions. Processing then moves to step 902 where the type T of the expression required at the indicated position is identified from the syntax rules for the language. Processing then moves to step 903 where the AST created to date by the code editor for the section of program code is searched for the set of possible code insertions P(1). Processing then moves to step 904 where any expression from the set P(1) that is of type T is added to a set C of candidate code completions. Processing then moves to step 905 where each expression in the set P(1) is inspected to determine if it provides a set of possible field dereference or subroutine calls and would thus provide further possible code insertions.

Processing then moves to step 906 where each new expression formed by the dereference of a field or a subroutine call is added to a new list of possible code insertions P(n+1), that is P(2) where n is an iteration counter. Processing then moves to step 907 where any of the expressions in the set P(n+1) of type T are added to the set C of possible code completions. Processing then moves to step 908 where the iteration counter n is compared to a predetermined threshold H. The threshold H determines the number of iterations of steps 905 to 907 that are performed to produce the final set of candidate code insertions for presentation to the user. In the present embodiment, H is set to three. Thus steps 905 to 907 are performed once more before processing moves from step 908 to step 909. At step 909, where the set of candidate code completion, such as those of FIG. 3, are presented to the user for selection via the display 103. Processing then moves to step 910 where the process ends. The user may either select one of the set C of candidate code completions or ignore the set C. Any selected candidate code insertion is inserted at the indicated position in the section or program code.

In the above embodiment, Java™ system classes are omitted. In another embodiment, the system classes are included in the set of possible code insertions. In a further embodiment, other available classes, including third party classes, are included in the set of possible code insertions. In another embodiment, the set of possible code insertions may be limited to classes programmed by predetermined group of one or more users. In a further embodiment, the set of possible insertions includes those from a specific set of packages, modules, libraries or other structural grouping. As will be understood by those skilled in the art, such structural groupings may vary depending on the programming language being used.

In the above embodiments, the CA system is applied to the Java™ programming language. As will be understood by those skilled in the art, the use of the terms field and subroutine or method call are not limited to any particular programming language and may refer to any suitable symbolic construct, valid for the syntax of given language.

In the above embodiment, the AST provides the search area for the possible code insertions. In a further embodiment, the possible code insertions are established from analysis of the code when the CA facility is initiated by the user. As will be understood by those skilled in the art, there are equivalent structures to ASTs that hold suitable data about a section of program code that may be used to provide the search space for a set of possible code insertions.

In another embodiment, only one iteration of steps 905 to 907 is performed to produce the final set of candidate code insertions for presentation to the user for selection. In a further embodiment, three or more iterations of steps 905 to 907 are performed to produce the final set of candidate code insertions for presentation to the user for selection. In another embodiment five iterations of steps 905 to 907 are performed to produce the final set of candidate code insertions for presentation to the user for selection.

As will be understood by those skilled in the art, any candidate code insertion, once inserted, may require further editing, for example, to specify parameters or arguments. In a further embodiment, the CA facility is arranged to provide a set of candidate parameters or arguments in a similar manner to which it provides candidate code insertions. In one such embodiment, the possible arguments are provided after the selection of a candidate code insertion for insertion. In another such embodiment, the possible arguments are provided for each candidate code insertion in the set C. In a further such embodiment, the possible arguments are calculated as each set of possible code insertions is identified. In another embodiment the possible arguments are calculated after all sets of possible code insertions have been identified.

In the above embodiments, only one subroutine call of a given equivalent signature is provided in the set of candidate code insertions. In a further embodiment, all subroutines of a given equivalent signature are included. In another embodiment, subroutines that require the type being searched for as an input are omitted from the set of possible or candidate code insertions.

In the above embodiments, the candidate code insertions are selected from each set of possible code insertions P(n) each time a set P(n) is identified. In a further embodiment, the set of candidate code insertions is selected once all of the sets P(n) have been identified. Localness may be determined by code scope or physical separation within the code text. Candidate code insertions may be ordered by the frequency of use of the given expression in a section of program code. Candidate code insertions may be ordered alphanumerically.

In another embodiment name matching may by included for identifying expressions as possible code insertions. For example, if the target variable for an assignment is 'newT', a method called getNewT( ) may be preferable.

It will be understood by those skilled in the art that the apparatus that embodies a part or all of the present invention may be a general purpose device having software arranged to provide a part or all of an embodiment of the invention. The device could be single device or a group of devices and the software could be a single program or a set of programs. Furthermore, any or all of the software used to implement the invention can be communicated via any suitable transmission or storage means so that the software can be loaded onto one or more devices.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

We claim:

1. A method, implemented by at least one computer processor, for determining a set of candidate code insertions for insertion in program code, said method comprising:
   receiving an indication of a position in a section of program code at which a code insertion may be performed;
   determining a required type of said code insertion based upon syntax of said program code;
   identifying a set of possible code insertions at said position in said section of program code based upon the required type;
   identifying, from a possible code insertion in said set of possible code insertions, an available expression for providing a further possible code insertion;
   adding said further possible code insertion to said set of possible code insertions; and
   providing a set of candidate code insertions for selection by a user for insertion at said indicated position in said section of program code based upon said set of possible code insertions.

2. The method of claim 1, wherein
   said available expression is a field dereference.

3. The method of claim 1, wherein
   said available expression is a subroutine call.

4. The method of claim 3 further comprising:
   iteratively determining for each missing parameter in said subroutine call a value from said set of possible code insertions.

5. The method of claim 1 further comprising:
   identifying from said further possible code insertion a further available expression for providing a yet further possible code insertion; and
   adding said yet further possible code insertion to said set of possible code insertions for selection as a candidate code insertion.

6. The method of claim 5, wherein
   said set of candidate code insertions presented to a user for selection is ordered by a number of available expressions that said candidate code comprises.

7. The method of claim 1, wherein
   said required type is identified from a predetermined representation of semantics of said section of program code.

8. The method of claim 7, wherein
   said predetermined representation is an abstract syntax tree.

9. The method of claim 1, wherein
   said set of candidate code insertions presented to a user for selection is ordered depending on a level of scope of said candidate code insertion at said position.

10. The method of claim 1, wherein
    said set of candidate code insertions presented to a user for selection is ordered depending on a frequency of use of each said candidate code insertion in said section of code.

11. The method of claim 1, wherein
    said set of candidate code completions presented to a user for selection is ordered depending on a proximity in said section of code of each said candidate code insertion to said indicated position.

12. The method of claim 1, wherein
    only one of a plurality of equivalent forms is selected for inclusion in said set of possible code insertions.

13. A computer hardware system configured to determine a set of candidate code insertions for insertion into program code, comprising:
    at least one hardware processor, wherein the at least one hardware processor is configured to perform and/or initiate:
       receiving an indication of a position in a section of the program code at which a code insertion will be performed;
       determining, based upon syntax of the section of the program code, a required type of the code insertion;
       identifying, based upon the required type, a set of possible code insertions at the position in the section of the program code;
       identifying, from a possible code insertion in the set of possible code insertions, an available expression for providing an additional possible code insertion; and
       adding the additional possible code insertion to the set of possible code insertions.

14. The system of claim 13, wherein
    the available expression is a field dereference.

15. The system of claim 13, wherein
    the available expression is a subroutine call.

16. The system of claim 15, wherein the at least one processor is further configured to perform and/or initiate:
    iteratively determining, for each missing parameter in the subroutine call, a value from the set of possible code insertions.

17. The system of claim 13, wherein
    the required type is identified from a predetermined representation of semantics of the section of the program code.

18. The system of claim 13, wherein the at least one processor is further configured to perform and/or initiate:
    providing, to a user and based upon the set of possible code insertion, the set of candidate code insertions for insertion at the indicated position in the section of the program code.

19. The system of claim 18, wherein
    the set of candidate code insertions is ordered based upon a level of scope of the candidate code insertion at the position.

20. The system of claim 18, wherein
    the set of candidate code insertions is ordered based upon a frequency of use, in the section of code, of each candidate code insertion in the set of candidate code insertions.

21. The system of claim 18, wherein
    the set of candidate code insertions is ordered based upon a proximity in the section of code, to the indicated position, of each candidate code insertion in the set of candidate code insertions.

* * * * *